(12) United States Patent
Knepler et al.

(10) Patent No.: US 9,766,112 B2
(45) Date of Patent: Sep. 19, 2017

(54) SYSTEM AND METHOD FOR TESTING BEVERAGE APPARATUS BEFORE SHIPMENT

(75) Inventors: John T. Knepler, Springfield, IL (US); Kurt Powell, Auburn, IL (US); Dean Muller, Springfield, IL (US); Timothy P. Kaeding, Mechanicsburg, IL (US); Robert J. Kobylarz, Springfield, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 1668 days.

(21) Appl. No.: 11/105,676

(22) Filed: Apr. 14, 2005

(65) Prior Publication Data

US 2005/0230417 A1    Oct. 20, 2005

Related U.S. Application Data

(60) Provisional application No. 60/561,970, filed on Apr. 14, 2004.

(51) Int. Cl.
*A47J 31/40* (2006.01)
*G01F 25/00* (2006.01)

(52) U.S. Cl.
CPC ................ *G01F 25/0092* (2013.01)

(58) Field of Classification Search
CPC ............... G01F 25/0092; G01F 11/00
USPC ......... 99/279, 280, 285, 290; 324/512, 511, 324/522, 521, 527, 531; 29/593, 592.1; 73/865.8, 168, 432.1, 865.9, 1.74, 149; 702/118, 187, 1, 33, 34, 81, 82, 108, 112, 702/114, 115, 127, 182, 183, 184, 188, 702/189, 55; 137/551; 222/23, 1; 340/500, 540, 679, 870.01, 870.16; 141/83

See application file for complete search history.

(56) References Cited

U.S. PATENT DOCUMENTS

| | | | | |
|---|---|---|---|---|
| 2,061,487 A | * | 11/1936 | Scott | 324/511 |
| 3,802,542 A | * | 4/1974 | Lamb | 194/221 |
| 3,888,631 A | * | 6/1975 | Sturzinger | 422/413 |

(Continued)

FOREIGN PATENT DOCUMENTS

| | | | |
|---|---|---|---|
| DE | 19936674 A1 | * | 2/2001 |
| EP | 1331486 A1 | * | 7/2003 |
| WO | WO 0223735 A2 | * | 3/2002 |

OTHER PUBLICATIONS

Antony, Design of Experiements for Scientists and Engineers, Elsier, 2003.*

*Primary Examiner* — Quang D Thanh
*Assistant Examiner* — Brandon Harvey
(74) *Attorney, Agent, or Firm* — Barnes & Thornburg LLP

(57) ABSTRACT

A system and method for testing a beverage apparatus such as a beverage maker and/or dispenser before shipment. The beverage apparatus includes at least one component that can produce monitorable and/or measurable characteristic. The measurable characteristic may be compared against a threshold value and may include an acceptable tolerance range. In response to an out-of tolerance condition, a fail condition is displayed, otherwise a pass condition is displayed. Also disclosed is a system for storing the measurable characteristic so that the beverage apparatus can be analyzed by comparing its current state versus the baseline state measured before the beverage apparatus was shipped.

20 Claims, 3 Drawing Sheets

(56) References Cited

U.S. PATENT DOCUMENTS

| | | | | |
|---|---|---|---|---|
| 4,782,451 A | * | 11/1988 | Mazzarella et al. | 700/281 |
| 5,172,062 A | * | 12/1992 | Eisermann | 324/503 |
| 5,247,460 A | * | 9/1993 | LaBudde | 702/81 |
| 5,261,282 A | * | 11/1993 | Grabowski et al. | 73/861.05 |
| 5,481,968 A | * | 1/1996 | Clem | 99/452 |
| 5,484,614 A | * | 1/1996 | Clem | 426/231 |
| 5,628,229 A | * | 5/1997 | Krone et al. | 73/168 |
| 5,695,092 A | * | 12/1997 | Schrandt | 222/1 |
| 5,715,185 A | * | 2/1998 | Carter | 705/7.38 |
| 5,790,009 A | * | 8/1998 | Jackson | 337/348 |
| 5,824,921 A | * | 10/1998 | Kanai | 73/865.8 |
| 5,837,892 A | * | 11/1998 | Cavallaro et al. | 73/149 |
| 5,843,505 A | * | 12/1998 | Davidson | 426/298 |
| 5,975,747 A | * | 11/1999 | Flaherty | 700/240 |
| 6,026,229 A | * | 2/2000 | Carter | 703/6 |
| 6,027,758 A | * | 2/2000 | McHugh et al. | 426/615 |
| 6,127,185 A | * | 10/2000 | Melton et al. | 436/60 |
| 6,165,538 A | * | 12/2000 | Davidson | 426/614 |
| 6,210,727 B1 | * | 4/2001 | Miller et al. | 426/231 |
| 6,260,004 B1 | * | 7/2001 | Hays et al. | 702/183 |
| 6,322,833 B1 | * | 11/2001 | Davidson | 426/298 |
| 6,449,532 B1 | * | 9/2002 | Nicol | 700/233 |
| 6,587,739 B1 | * | 7/2003 | Abrams et al. | 700/83 |
| 6,595,390 B1 | * | 7/2003 | Yang | 222/63 |
| 6,632,464 B2 | * | 10/2003 | Davidson | 426/298 |
| 6,845,704 B2 | * | 1/2005 | Lassota et al. | 99/280 |
| 7,158,909 B2 | * | 1/2007 | Tarpo et al. | 702/118 |
| 7,158,918 B2 | * | 1/2007 | Bunn et al. | 702/182 |
| 7,253,635 B2 | * | 8/2007 | Hering et al. | 324/511 |
| 2002/0087578 A1 | * | 7/2002 | Vroman | 707/104.1 |
| 2002/0116208 A1 | * | 8/2002 | Chirnomas | 705/1 |
| 2003/0060994 A1 | * | 3/2003 | Deng et al. | 702/105 |
| 2003/0121937 A1 | | 7/2003 | Black et al. | |
| 2003/0208419 A1 | * | 11/2003 | Bunn | 705/29 |
| 2004/0015305 A1 | * | 1/2004 | Bunn et al. | 702/60 |
| 2004/0104857 A1 | * | 6/2004 | Kaindl | 343/703 |
| 2004/0128111 A1 | * | 7/2004 | Lang | 702/188 |
| 2004/0232162 A1 | * | 11/2004 | Zimmermann et al. | 222/63 |

* cited by examiner

SYSTEM AND METHOD FOR TESTING BEVERAGE APPARATUS BEFORE SHIPMENT

RELATED APPLICATION

This application claims the benefit of U.S. Provisional Application No. 60/561,970 filed Apr. 14, 2004, the disclosure of which is hereby incorporated by reference in its entirety.

BACKGROUND

The present application relates to a method of checking, analyzing or otherwise verifying the operation of food or beverage apparatus after manufacture and before it is shipped to a distributor, customer, end user, or the like. A food and beverage apparatus such as a beverage maker and/or dispenser, and its various components, are manufactured using a variety of processes. At some point, the fully assembled apparatus is ready to be shipped. Various quality assurance methods are known to verify the apparatus has been manufactured according to specifications. Manufacturers are desirous of new methods to verify the apparatus has been assembled correctly prior to shipment, and desirous of such methods being performed as quickly and efficiently as possible.

Briefly, and in accordance with the foregoing, disclosed is a system and method for checking food and beverage apparatus and/or components prior to shipment. The fully assembled apparatus, or subparts (referred to herein collectively as a "beverage apparatus"), that are desired to be checked, are positioned in a manner to allow access to the diagnostic output. The diagnostic test may be related to one or more components and include information related to voltage, current, phase angle, time, and temperature. The diagnostic output information is compared against a predetermined acceptable range for the particular beverage apparatus. If the diagnostic output information is within the acceptable range, a pass condition is indicated. Otherwise, a fail condition is indicated.

Additional features and embodiments will become apparent to those skilled in the art upon consideration of the following detailed description of drawings.

BRIEF DESCRIPTION OF THE DRAWINGS

The present disclosure will be described hereafter with reference to the attached drawings which are given as a non-limiting example only, in which.

Figure 1:
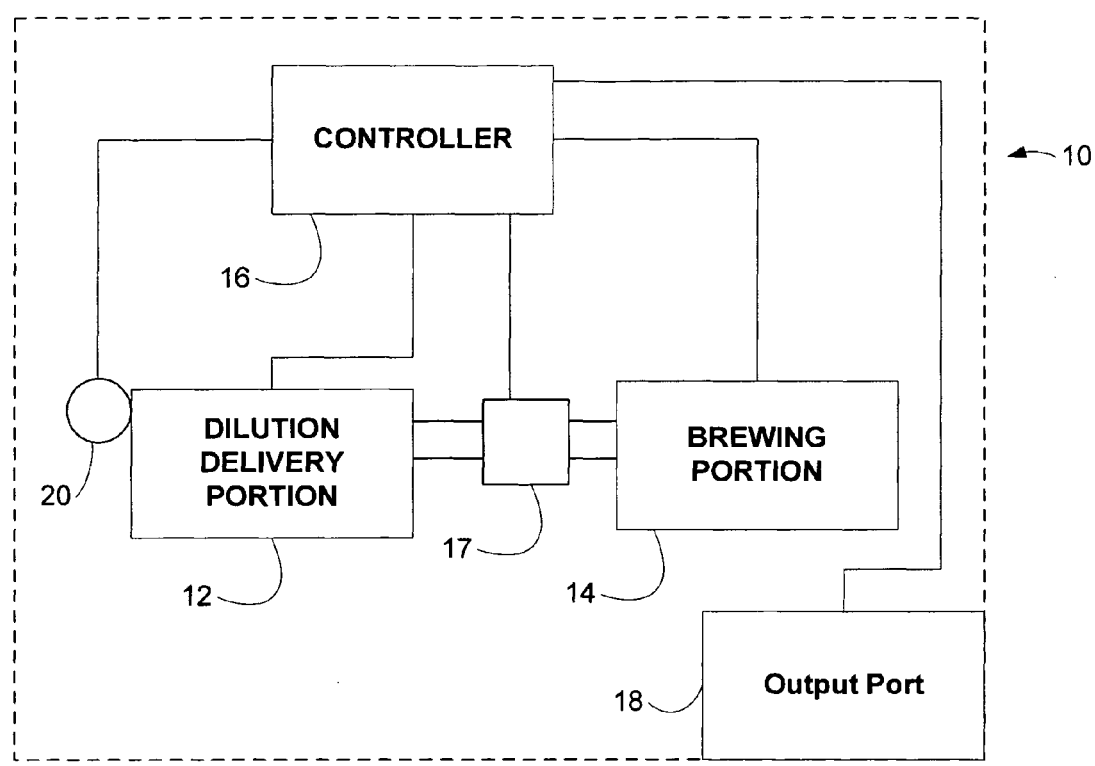
FIG. 1 is a simplified diagrammatic view of a beverage apparatus that may tested by the disclosed method.

The exemplification set out herein illustrates embodiments of the disclosure that is not to be construed as limiting the scope of the disclosure in any manner.

DETAILED DESCRIPTION

While the present disclosure may be susceptible to embodiment in different forms, there is shown in the drawings, and herein will be described in detail, embodiments with the understanding that the present description is to be considered an exemplification of the principles of the disclosure and is not intended to be exhaustive or to limit the disclosure to the details of construction and the arrangements of components set forth in the following description or illustrated in the drawings.

The term beverage apparatus is intended to be broadly interpreted as including but not being limited to beverage brewers and dispensers. The term dispenser may include but not be limited to apparatus which brew, mix, reconstitute, dispense unreconstituted, infuse, pump or any other process or form of dispensing beverage. Terms including brewed, brewing, brewing substance, brewing liquid, and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating, cooling, freezing, heating or passing a liquid through or otherwise mixing or combining a beverage or food substance with a liquid such as water without a limitation to the temperature of such liquid unless specified. This broad interpretation is also intended to include, but is not limited to beverage or food substances such as ground coffee, tea, soup, liquid beverage or food concentrate, powdered beverage or food concentrate, freeze dried beverages or foods or other food concentrates. Additionally, other forms of juice, tea and beverage concentrates and liquid, semi-liquid or gel form may be provided.

FIG. 1 is a simplified diagrammatic view of a typical beverage apparatus 10. Beverage apparatus 10 includes a water or dilution delivery portion 12, and brewing portion 14. For example, if beverage apparatus 10 is a coffee brewer, dilution delivery portion 12 could be a hot water tank for storing and heating water therein and brewing portion 14 could be an outlet line leading to a spray head for distributing the hot water onto coffee grounds positioned thereunder in a brewing basket, for final delivery into a coffee pot or carafe. Beverage apparatus 10 may also include a controller 16 for controllably operating at least a portion of beverage apparatus 10. Controller 16 may be any suitable electrical control component of known construction such as a circuit board, integrated circuit, or control chip. Beverage apparatus 10 may also include a number of valves 17, such as solenoid valves, positioned at various positions along the beverage making path that may be controllably operated by controller 16.

Beverage maker 10 may also include an output port 18 for outputting diagnostic and other information. Output port 18 may be in communication with controller 16 or to specific components. In an embodiment in which information is outputted by controller 16, controller 16 is built or includes programming for receiving diagnostic information from beverage apparatus' 10 components such as valve 17 or receiving status information from such components and interpreting the status information to diagnose the component. Such diagnostic information may be retrieved from the beverage apparatus 10 via the output port 18 or by direct connection to controller 16 such as by making an electrical connection to a portion of controller's 16 circuit board, in an embodiment in which beverage apparatus 10 has such controller 16.

Controller 16 may also acquire information via electrical connection to one or more sensors 20 positioned throughout beverage apparatus 10. The sensors 20 may be coupled to a specific component for sensing the characteristics of the component or may be configured to sense other characteristics. Controller 16 may use the information to monitor the performance of the beverage apparatus 10. In another embodiment, sensors 20 are in communication with output port 18 for direct outputting of information sensed by sensors 20 to devices outside beverage apparatus 10. Sensor 20 may be, for example, a flow meter or a meter to measure characteristics of the input power. The information which is provided to the controller 16 may be associated with one or more components of the equipment and, depending on the nature of the component(s) being monitored, may include information relating to voltage (V), current (I), phase angle (Φ), temperature (T) and/or time (t). For example, if a purely resistive component, such as a heater, is being monitored, it is sufficient to monitor V and I. On the other hand, if a component with some inductance, such as a solenoid, is being monitored, phase angle (Φ) and time (t) may need to be monitored. Furthermore, it is possible to monitor the number of times the solenoid is activated and calculate the total amount of dilution material which is used over a given period of time (if the assumption is made that a predetermined volume of dilution material is used per solenoid operation). Such volumetric diagnostics can be performed generally at the same time as the collection of the diagnostic information described above.

Beverage apparatus 10 may be specifically configured to facilitate focused monitoring. For example, the beverage apparatus 10 may be configured to momentarily turn off or disable one device or component in the beverage apparatus 10, such as a tank heater, while another device, such as a solenoid, is turned on. This permits more precise and accurate monitoring by the sensors 20 or other monitoring equipment. Precision and accuracy of monitoring is increased because the relatively small solenoid current would not be hidden or masked by the presence of a large tank heater current. In other words, the characteristic being monitored, in this example current, is monitored in the absence of other potentially confusing characteristics.

As discussed, the information provided to the controller may relate to voltage (V), current (I), phase angle (Φ), and time (T) or other monitorable characteristics. In one example, if the monitorable characteristic is current, information could be communicated from a component or sensor 20 to controller 16 or output port 18 by pulsing the current in a predetermined code. Other methods for communicating to controller 16 or output port 18 may be used as well.

By allowing the measurable characteristic to be one or a combination of voltage (V), current (I), phase angle (Φ), time (t), and temperature (T), many different aspects of the functioning of the beverage apparatus 10 can be checked. For example, energy consumption can be monitored by measuring V, I, Φ and t, the activation of various loads within the apparatus can be monitored by measuring V, I and Φ and it can be determined by measuring V and I whether one or more loads in the beverage apparatus 10 are within accepted limits.

Additionally, the amount of dilution material, such as water, used by beverage apparatus 10, can be determined in at least the following two ways: 1) because one gram of water increases in temperature by one degree centigrade for one calorie of added heat, water used by beverage apparatus 10 can be determined by measuring V, I and T, wherein ending temperature is set by a thermostat in beverage apparatus 10, and beginning temperature can be estimated or measured by a sensor 20; 2) by measuring Φ and t, wherein Φ is zero (i.e., all loads in the beverage apparatus 10 are resistive) except when a solenoid in the beverage apparatus 10 is turned on. If the beverage apparatus 10 employs a flow regulator, valve on-time multiplied by flow rate will determine total volume. For a 240 volt beverage apparatus 10, another way of determining solenoid valve on-time is to measure the current in the neutral wire at the power source, wherein the solenoid is a 120 volt device connected between one line and neutral. As discussed above, it is possible to monitor the number of times a solenoid is activated, and then calculate the total amount of dilution material which is used over a given period of time (if the assumption is made that a given volume of dilution material is used per solenoid operation).

Figure 2:
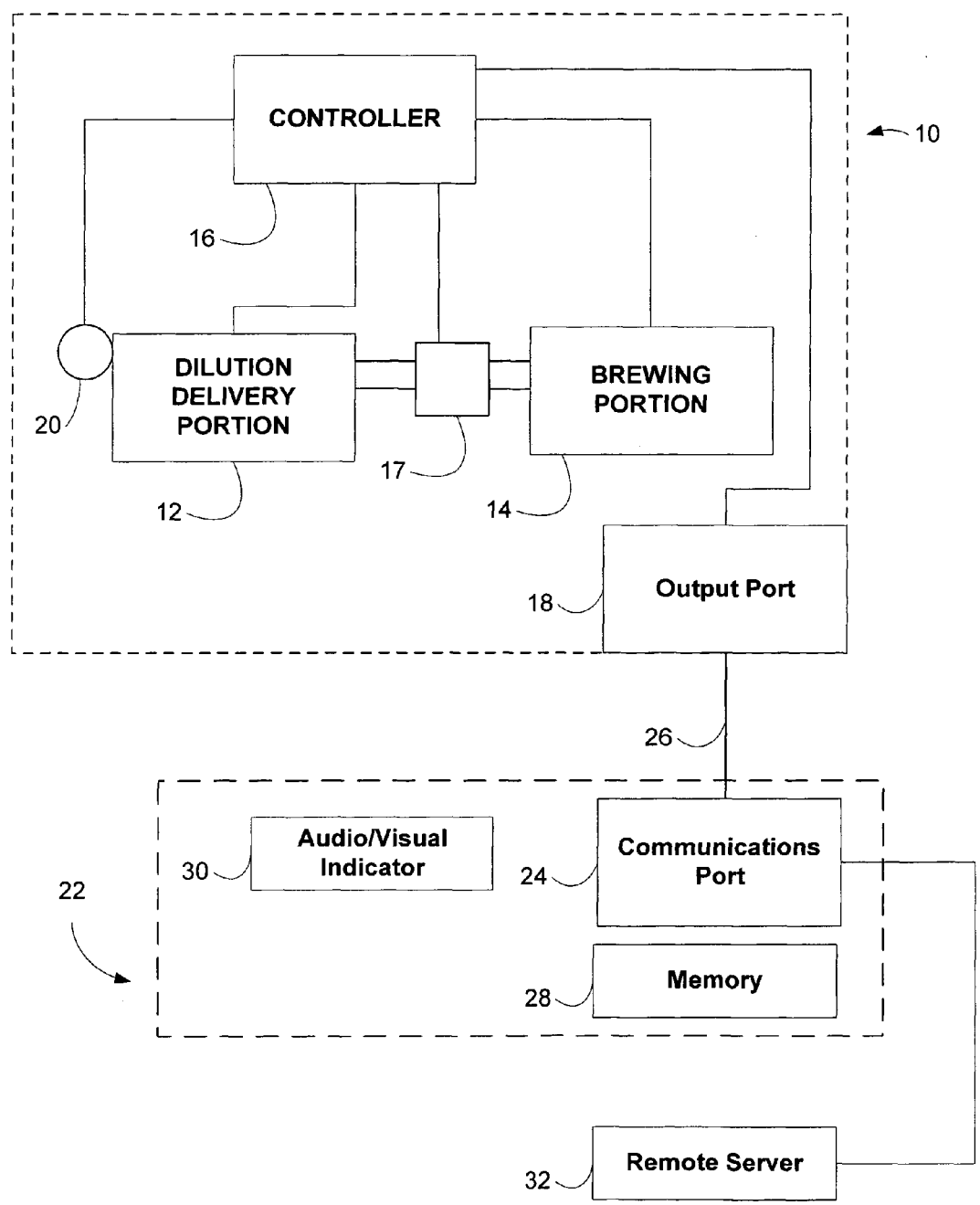
FIG. 2 is simplified diagrammatic view of the beverage apparatus of FIG. 1, in communication with an external device for receiving and interpreting diagnostic information.

As shown in FIG. 2, signals corresponding to monitorable and/or measurable characteristics may be sent via output port 18 to an external device 22. By way of example and not limitation, device 22 could be a general purpose computer of known construction, handheld device, or proprietary computer device for analyzing data received from beverage apparatus 10. The external device 22 includes a communication port 24 for connection to beverage apparatus 10 via a communications line 26 which may be a wired or wireless connection. External device 22 may also include or otherwise be coupled to memory 28 for storing and loading acceptable targets and/or ranges for comparison against the characteristics. External device 22 may have programming for making this comparison and reporting in-tolerance/out-of-tolerance or pass/fail conditions. The reporting may come by way of any type of audio or visual indicator 30 including displaying a fail message on a screen, illuminating an indicator light on external device 22, or communicating back to the beverage 10 to illuminate an audio or visual indicator thereon. In a computer embodiment having a monitor, a screen may also be shown having information corresponding to a pass or fail condition or showing other information about the test.

In an embodiment in which controller 16 is used to collect and interpret the data, controller 16 may itself have memory for storing tolerance limits and programming for comparing characteristics to tolerance limits. In this embodiment, controller 16 would may also controllably operate some indicator on or in communication with beverage apparatus 10 to indicate a pass or fail condition.

Use of an external device 22 may be desirable because external device 22 can be designed to log the results of multiple tests, such as by storing the results in data format in a database on the device's 22 hard drive. The data in the log can be used for statistical analysis of a particular production run. This may also be used to adjust production for future runs, to assist in product redesigns, or for quality control purposes. The data in the log for a particular beverage apparatus 10 can also be stored, either on the external device 22 or to a remote server 32. The data can then be used as baseline or factory set standard for that beverage apparatus 10. That baseline may be subsequently compared to the state of the beverage apparatus 10 in the field, or returning from the field, for a variety of purposes, including measuring deviation to diagnose problems, optimize or reset settings, or to do statistical analysis on one or more components of the beverage apparatus 10.

The software code used to receive and analyze data received from the beverage apparatus 10 may be adapted using techniques known in the art and may include one or more software module runs on a general purpose computer or embedded in a chip or circuit. The term "computer module" or "software module" referenced in this disclosure is meant to be broadly interpreted and cover various types of software code including but not limited to routines, functions, objects, libraries, classes, members, packages, procedures, methods, or lines of code together performing similar functionality to these types of coding. The components of the present disclosure are described herein in terms of functional block components, flow charts and various processing steps. As such, it should be appreciated that such functional blocks may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices. Similarly, the software elements of the present disclosure may be implemented with any programming or scripting language such as C, SQL, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like as well as those yet to be conceived.

In use, assembled beverage apparatus 10 is placed in a location suitable for testing, by way of example and not limitation, at the end of production line, in a pre-shipment location, or other suitable location. Beverage apparatus 10 is turned on and connected either via a wired electrical connection, or wireless connection, to an external device 22. In an embodiment where controller 16 collects and interprets data, the machine is operated in a manner to allow the components and sensors 20 to communicate information corresponding to characteristics to controller 16. Controller 16 outputs the information to the external device 22 which performs a comparison of the information to acceptable ranges stored in the external device's memory 24 or controller 16 performs the analysis internally and operates an indicator to show the test result. For either the external device 24 or controller 16 test, if the information falls within acceptable ranges, a first indication corresponding to a pass condition is expressed to the user, such as by illuminating a green light or displaying a "PASS" message on a computer screen. If the information falls outside the acceptable range, a different, second indication is made, such as by illuminating a red light or displaying a "FAIL" message on a computer screen. In addition, or in the alternative to the pass/fail testing, the beverage apparatus 10 may be queried for status information and have that information recorded and/or analyzed by external device 24 which may subsequently send the information to a remote server 32.

Although the test may be designed to identify specific and accurate information about the condition of the beverage apparatus 10, in order to maintain speed and cost efficiencies, the test procedure may instead be used as a measure of whether an aggregate number of characteristics, measured together, fall within accepted ranges. This can be useful, for example post-quality control, as a spot check of certain equipment. This use is intended to be one example of how the present method can be used. Of course, a diagnostic routine having more specific and analytical results may be used in connection with this disclosure as well.

Figure 3:
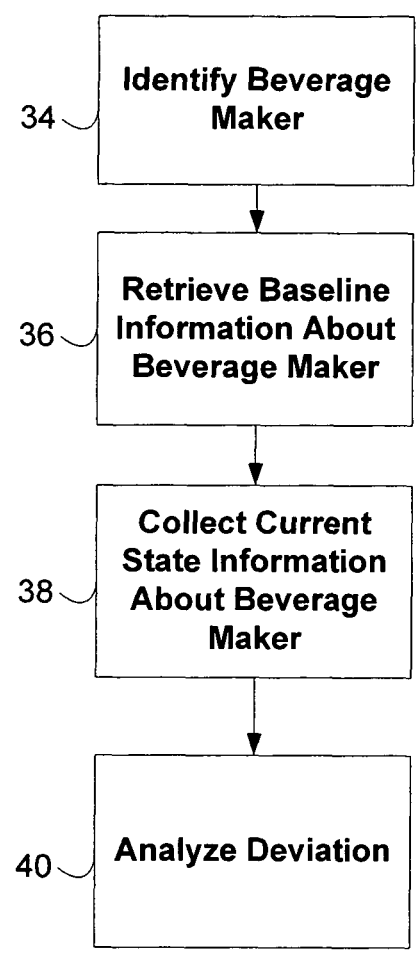
FIG. 3 is flowchart showing the steps in a method of diagnosing a beverage apparatus using baseline data collected when the beverage apparatus was tested before shipment.

Another method that may be performed in connection with present disclosure is testing a beverage apparatus 10 after leaving the factory using the baseline data collected during the testing before shipment. The method includes the following steps as shown in FIG. 3. In a first step 34, a beverage apparatus that has been deployed in the field, or has returned from use, is identified. The identification may be performed using an internal or external indicia, such a serial number, RFID, or the like, or be an electronic serial number retrieved from some component of the beverage apparatus 10 such as controller 16. Once the beverage apparatus 10 is identified, in a subsequent step 36, information about the baseline data is retrieved. This retrieval may be from external device 24 or may be retrieved from remote server 32.

In a next step 38, information about the beverage server's current state is collected. The type of information collected may be the same as the information collected when the beverage maker was tested before shipment, or have at least some data elements in common. Finally, the collected information is compared against the retrieved information, and a deviation is determined and analyzed (step 40). The deviation may be analyzed for a variety of purposes including but not limited to those mentioned above, and may also be used to determine how the beverage apparatus 10 was used in the field, and if necessary, what action should be taken to repair the beverage apparatus 10. The action may include, but is not limited to, reconfiguring the beverage maker to the original baseline configuration, replacing a component, modifying settings or parameters of the beverage maker to take into account the deviations, and replacing the beverage maker.

Use of the present system and method may be particularly beneficial in the beverage apparatus market as compared to other industries. In particular, beverage apparatus manufacturers may often deploy a large quantity of generally identical beverage apparatuses to a customer, such as in a scenario where the customer is a franchise or multiple-location operation. Beverage apparatus manufacturers may have a need to perform statistical analyses on the condition of beverage apparatus before shipment to the customer, longevity in the field, effects of use in particular environments, and other information that may obtained in connection with a baseline being established for the apparatus before it is shipped.

Further, as the components in the beverage apparatus industry evolve to become more complex, such as in the incorporation of microcontrollers, communications ports, and updatable or flash memory, manufacturers continue to seek efficient modes of testing the beverage apparatus before shipment.

While embodiments have been illustrated and described in the drawings and foregoing description, such illustrations and descriptions are considered to be exemplary and not restrictive in character, it being understood that only illustrative embodiments have been shown and described and that all changes and modifications that come within the spirit of the invention are desired to be protected. The applicants have provided description and figures which are intended as illustrations of embodiments of the disclosure, and are not intended to be construed as containing or implying limitation of the disclosure to those embodiments. There are a plurality of advantages of the present disclosure arising from various features set forth in the description. It will be noted that alternative embodiments of the disclosure may not include all of the features described yet still benefit from at least some of the advantages of such features. Those of ordinary skill in the art may readily devise their own implementations of the disclosure and associated methods, without undue experimentation, that incorporate one or more of the features of the disclosure and fall within the spirit and scope of the present disclosure and the appended claims.

What is claimed is:

1. A method of testing at least one component of a beverage maker, the method comprising the steps of:
   providing the beverage maker having been assembled and prior to shipment from a manufacturing facility, the beverage maker having the at least one component that can produce at least one measurable characteristic before shipment from the manufacturing facility;
   testing the beverage maker by retrieving at least one signal from the at least one component of the beverage maker corresponding to the at least one measurable characteristic for providing baseline information associated with the at least one component of the beverage maker prior to shipping from the manufacturing facility;
   assigning one of a pass condition and a fail condition to the at least one component of the beverage maker based on a range of signal values for the at least one component of the beverage maker;
   saving the baseline information relating to a pass condition signal on a device carried directly on the beverage maker, with the baseline information being selectively retrievable directly from the beverage maker;
   after use of the beverage maker to make beverage, comparing a measured current state of the at least one measurable characteristic of the at least one component of the beverage maker to the baseline information of the same at least one measurable characteristic to determine a deviation between the baseline and the current state used to analyze the condition of the at least one component of the beverage maker;
   using the deviation to at least one of repair, reconfigure and adjust settings of the at least one component of the beverage maker; and then
   using the beverage maker to make beverage.

2. The method of claim 1, further comprising the step of testing the beverage maker further including comparing the at least one measurable characteristic to a predetermined tolerance to determine the pass condition or the fail condition.

3. The method of claim 1, further comprising, after the step of providing the beverage maker, providing a device for measuring the at least one measurable characteristic in communication with at least one component of the beverage maker, the device being configured to analyze the at least one measurable characteristic, and providing an indicator in communication with and controllably operated by the device for indication of one of the pass condition and the fail condition.

4. The method of claim 3, further comprising: providing at least one sensor in communication with at least one component of the beverage maker, the at least one sensor being adapted to sense one or more of a flow, a voltage, a current, a phase angle, a temperature, and a period of time; and using the at least sensor to produce the at least one signal.

5. The method of claim 3, further comprising providing a controller in communication with and controllably operating at least one of at least one sensor and the beverage maker.

6. The method of claim 5, further comprising disabling at least one component of the beverage maker other than the component for which the at least one characteristic is being measured while the step of testing is being performed.

7. The method of claim 5, further comprising providing an external device attachable to the controller, and storing the at least one measurable characteristic in the external device.

8. The method of claim 7, further comprising providing a remote server and sending the at least one measurable characteristic to the remote server over a communications network.

9. The method of claim 1, wherein the least one measurable characteristic is energy consumption.

10. The method of claim 1, wherein the least one measurable characteristic is the amount of dilution material.

11. A method of analyzing at least one component of a beverage maker, the method comprising the steps of:
    storing on the beverage maker at least one measurable characteristic of the at least one component of the beverage maker measured after having been assembled and before the beverage maker is shipped from a manufacturing facility, the measured characteristic providing baseline information, the at least one component of the beverage maker being at least one of a valve, thermostat, solenoid, flow regulator, flow meter and power meter;
    deploying the beverage maker into the field and making beverage;
    identifying the beverage maker;
    retrieving the baseline information directly from the beverage maker;
    after the deploying, identifying and retrieving steps, comparing a measured current state of the at least one measurable characteristic of the at least one beverage maker component used to make beverage to the baseline information of the same at least one measurable characteristic to determine a deviation between the baseline and the current state to analyze the condition of the at least one component of the beverage maker; and
    using the deviation to at least one of repair, reconfigure and adjust settings of the at least one component of the beverage maker to correct at least one of dilution, temperature, flow, input power and energy consumption.

12. The method of claim 11, wherein the step of using the deviation to at least one of repair, reconfigure and adjust settings of the at least one component of the beverage maker further comprises replacing the beverage maker.

13. The method of claim 11, further comprising the step of resetting at least one of a thermostat, flow regulator, solenoid, solenoid valve, dilution delivery portion and brewing portion of the beverage maker to reproduce the at least one measurable characteristic.

14. The method of claim 11, further comprising the step of adjusting a configuration of the beverage maker to account for the deviation.

15. A method of analyzing at least one component of a beverage maker, the method comprising the steps of:
    providing the beverage maker comprising a plurality of components for making beverage, each of the plurality of components for making beverage having monitorable characteristics comprising at least one of voltage, current and phase angle, the plurality of components for making beverage each having a factory setting for at least one of voltage, current and phase angle,
    testing the beverage maker before shipment to establish baseline data for the monitorable characteristics for each of the plurality of components for making beverage, whereby the baseline data for the plurality of components comprises the baseline configuration of the beverage maker, deploying the beverage maker in the field and using the beverage maker, after deploying and using the beverage maker, testing monitorable characteristics of voltage and current of at least one of the plurality of components for making beverage, determining a deviation between the monitorable characteristics resulting from testing after deploying and using and the baseline data monitorable characteristics of the at least one of the plurality of components for making beverage, finding the deviation is not within an acceptable range, and taking action to repair the beverage maker.

16. The method of claim 15, wherein the step of taking action to repair the beverage maker comprises reconfiguring the beverage maker to the baseline configuration.

17. The method of claim 15, wherein the step of providing the beverage maker includes providing a heater having baseline voltage and current monitorable characteristics.

18. The method of claim 15, wherein the step of providing the beverage maker includes providing a solenoid having baseline phase angle and time monitorable characteristics.

19. The method of claim 15, wherein the step of taking action to repair the beverage maker comprises modifying settings to take into account the deviation.

20. The method of claim 15, wherein the step of taking action to repair the beverage maker comprises at least one of replacing one of the plurality of components and replacing the beverage maker.

* * * * *